Patented Sept. 4, 1951

2,567,130

UNITED STATES PATENT OFFICE 2,567,130

WATER-DISPERSIBLE PASTES OF GAS FUME FADING INHIBITORS FOR ACETATE SILK DYES

Francis Hervey Smith, Woodstown, N. J., assignor to E. I. du Pont de Nemours and Company, Wilmington, Del., a corporation of Delaware No Drawing. Original application February 11, 1947, Serial No. 727,935. Divided and this application May 5, 1950, Serial No. 160,391

6 Claims. (Cl. 8—61)

This invention relates to the preparation of gas fume fading inhibitors for use in the dyeing of acetate silk, and more particularly to the preparation of such materials in paste form. And this application is a division of my co-pending application Serial No. 727,935 filed February 11, 1947, now U. S. Patent 2,518,393.

It is known that a number of N:N'-diaryl (or dialkyl) substituted alkylene diamines are effective inhibitors of gas fume fading for dyes when applied to cellulose acetate silk, as more particularly disclosed in U. S. Patent 2,416,380 to Collie, Giles and Wilkinson, Serial No. 492,308, filed June 25, 1943. In the use of these diamine compounds, it has been found essential, however, that when used in the dye bath they be present in a very highly dispersed state. I have found that this class of diamines, which will hereinafter be illustrated by N:N'-diphenyl-ethylene-diamine particularly, can be effectively dispersed in aqueous medium with a non-ionic dispersing agent such as polyvinyl alcohol or methyl cellulose, particularly when the N:N'-diphenyl-ethylene-diamine is mixed with the polyvinyl alcohol above the melting point of the diamine and this mixture circulated through an homogenizer. I have found, however, that such a dispersion is not permanent, for, on cooling and standing for an extended length of time, the N:N'-diphenyl-ethylene-diamine assumes its normal crystalline form and the crystals build up to form aggregates of considerable size which separate out upon standing.

It is highly desirable to produce these diamines in a highly dispersed form which prohibits crystal growth so that they will not settle out upon standing or when stored for a considerable length of time.

It is therefore an object of this invention to prepare aqueous dispersions of N:N'-diphenyl-ethylene-diamine and related diamine compounds from which the diamine compound will not separate in macro crystalline form but which will remain dispersed throughout the aqueous medium. It is a further object of the invention to provide stable aqueous pastes of N:N'-diphenyl-ethylene-diamine and related diamine compounds for use in the treatment of cellulose acetate silk for preventing gas fume fading of dyes applied thereto which are stable upon standing and which do not dry out upon reasonable exposure to air and in which the diamine compound does not crystallize in aggregates which cause separation from the aqueous paste and in which the diamine compound remains finely dispersed.

I have found that, where N:N'-diphenyl-ethylene-diamine or related gas fume fading inhibitors are dispersed in an aqueous mixture of either polyvinyl alcohol or methyl cellulose, to which solution an oil-like high boiling non-volatile water immiscible liquid compound is added, and the mixture is passed through an homogenizer to form a relatively non-fluid emulsion in a heavy paste form, there is no appreciable crystallization of the N:N'-diphenyl-ethylene-diamine or related diamine compound or separation of the components when the paste is allowed to stand for substantial periods of time such as during storage, and that the paste is relatively stable and does not dry out excessively when exposed to air for such reasonable lengths of time as required in the normal use of such product.

The non-volatile oil-like water-immiscible organic liquids which have been found to be suitable for stabilizing these pastes are particularly those liquids which are used as plasticizers in the preparation of resin products, such as dimethyl phthalate, phenyl Cellosolve, benzyl Cellosolve, tributoxy ethyl phosphate, diisobutyl adipate, etc., and when the expression "an organic liquid which may be used as a plasticizer in preparation of resin products" is used in the claims, I am referring to such products. It is also advantageous, although not essential, to add a small amount of an anionic dispersing (deflocculating) agent to the aqueous suspension prior to homogenization, since it aids in the redispersibility of the paste when added to aqueous textile treating baths. Such anionic dispersing agents which are suitable for use in these pastes are lignin sodium salt, lignin sodium sulfonate, dinaphthylmethane disulfonic acid, long chain alkyl sodium sulfonates, long chain alkyl sulfate esters, etc.

The anti-fume agents with which the present invention is particularly concerned are those described in U. S. Patent 2,416,380 to Collie, Giles and Wilkinson Serial No. 492,308, which have the general formula:

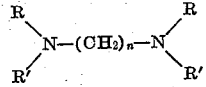

wherein $n$ is an integer of from 2 to 6, inclusive, R=H, methyl, ethyl and hydroxy-ethyl, and R' is a radical of the group consisting of phenyl, alkoxyphenyl, alkyl phenyl and chlorine-substituted phenyl. Specific examples are N:N'-dimethyl - N:N'-diphenyl - ethylene - diamine, N:N' - diethyl - N:N' - diphenyl - ethylene - diamine, N:N'-dimethyl-N:N'-diphenyl-trimethyl-ene-diamine, N:N' - diethyl - N:N' - diphenyl-trimethylene-diamine, N:N' - diphenyl - N:N' - di- (beta - hydroxy - ethyl) - ethylene - diamine and N:N'-diphenyl-hexamethylene-diamine.

These water dispersible non-fluid pastes preferably contain from 30% to 50% of the diamine compound, from 1% to 5% of the non-ionic dispersing agent such as polyvinyl alcohol and methyl cellulose, from 2% to 15% of the non-volatile water-immiscible solvent, and, where the anionic dispersing agent is used, it may be employed in amounts of from 0.5% to 3%, all of which are based on the total weight of the paste, the remaining per cent in each case being the water.

The N:N'-diphenyl-ethylene-diamine or related diamine compound may be dispersed in the mixture at a temperature either below or above the melting point of the crystalline diamine compound. When the mixture is homogenized even above the melting point of the diamine compound, it remains highly dispersed throughout the mixture and does not agglomerate upon cooling. Although the exact function of the non-volatile oil-like water-immiscible liquid in the emulsion is not known, it appears that this oil-like substance may form a protective coating for the diamine particles, thereby preventing the crystals from joining and forming relatively large aggregates. However, the oil-like materials which I have found to be particularly suitable are those in which the diamine compounds are soluble, and it is possible that the emulsion of the water-immiscible liquid in the water, in which emulsified particles the diamine is incorporated, may prevent the undesirable crystal growth which normally takes place in the absence of such water-immiscible liquid. These water-immiscible liquids which are non-volatile also prevent the emulsion from drying out and thereby causing separation, and acts to produce a much more stable emulsion paste than can otherwise be obtained.

The addition of the anionic dispersing agent of the types above mentioned, in addition to the non-ionic polyvinyl alcohol or methyl cellulose, enhances the redispersibility of the paste when it is added to the aqueous treating baths.

The polyvinyl alcohol employed as the non-ionic dispersing agent in the preparation of these stable pastes may vary widely in its composition, but it is preferably one that has a saponification number of from 40 to 180 and a viscosity as a 4% aqueous solution at 20° C. of from 10 to 40 centipoises, which includes, in general, the commercially available polyvinyl alcohols. The methyl cellulose employed may be any of the commercial products particularly those which have a viscosity of from 15 to 500 centipoises.

The following examples are given to illustrate the invention. The parts used, unless otherwise designated, are by weight.

The particular polyvinyl alcohol employed in the following examples was a commercial product having a saponification number of from 84 to 105, a viscosity in a 4% aqueous solution at 20° C. of from 25 to 30 centipoises.

Example 1

| | Parts |
|---|---|
| N:N'-diphenyl-ethylene-diamine | 40.0 |
| Polyvinyl alcohol | 3.8 |
| Dimethyl-phthalate | 10.0 |
| Water | 46.2 |
| | 100.0 |

Dissolve 3.8 parts of polyvinyl alcohol in 46.2 parts of water at from 80° to 85° C. with stirring. Cool the solution to 40° C. and add 40 parts of N:N'-diphenyl-ethylene-diamine. Mix well. Add 10.0 parts of dimethyl-phthalate and mix well. Pass the mixture through an homogenizer and process to a smooth paste, holding the temperature below 45° to 50° C. Continue processing in the homogenizer until not over 10% is retained in a 150 mesh sieve when a sample is made into a dilute aqueous suspension, and filtered.

Example 2

| | Parts |
|---|---|
| N:N'-diphenyl-ethylene-diamine | 40.0 |
| Polyvinyl alcohol | 3.8 |
| Phenyl Cellosolve | 5.0 |
| Water | 51.2 |
| | 100.0 |

Dissolve 3.8 parts of polyvinyl alcohol in 51.2 parts of water at from 80° to 85° C. with stirring. Cool the solution to 40° C. and add 40 parts of N:N' - diphenyl - ethylene - diamine. Mix well. Pass the mixture through an homogenizer and process to a smooth paste, holding the temperature below 45° to 50° C. Repass the paste through the homogenizer until not over 10% is retained on a 150 mesh sieve when filtered from a dilute water suspension. Stir in 5 parts of phenyl Cellosolve and mix well.

Example 3

Procedure identical to Example 2, except benzyl Cellosolve is substituted for phenyl Cellosolve.

Example 4

Procedure similar to Example 2 except tributoxy-ethyl-phosphate is substituted for phenyl Cellosolve.

Example 5

| | Parts |
|---|---|
| N:N'-diphenyl-ethylene - diamine | 40.0 |
| Methyl cellulose 25 CPS | 1.4 |
| Dimethyl - phthalate | 5.0 |
| Water | 53.6 |
| | 100.0 |

Dissolve 1.4 parts of methyl cellulose in 53.6 parts of water. Melt 40.0 parts of N:N'-diphenyl-ethylene-diamine by heating to 70° C. Add 5.0 parts of dimethyl-phthalate to the molten N:N'-diphenyl-ethylene-diamine and mix in well. Warm the aqueous solution of methyl cellulose to 50°-53° C. and add slowly with good agitation to the molten N:N'-diphenyl-ethylene-diamine, mix, heating as required to maintain a temperature of 65°±1° C. Pass the final mixture through an homogenizer and process to a smooth paste holding the temperature at between 55° and 65° C. The resulting paste should remain plastic on cooling. When filtered from a dilute (approximately 1%) aqueous suspension, not over 2% of residue, after drying, should be retained on a 150 mesh sieve.

Example 6

| | Parts |
|---|---|
| N:N'-diphenyl-ethylene-diamine | 40.0 |
| Polyvinyl alcohol | 2.5 |
| Dimethyl-phthalate | 5.0 |
| Lignin sodium salt | 2.0 |
| Water | 50.5 |
| | 100.0 |

Dissolve 2.5 parts of polyvinyl alcohol in 50.5 parts of water at from 80° to 85° C. with stirring. Add 40.0 parts of N:N'-diphenyl-ethylene-diamine, heating as necessary to maintain a temperature of from 70° to 75° C. Add 5.0 parts of dimethyl-phthalate and 2.0 parts of lignin sodium salt, and mix in well. Pass the final mixture through an homogenizer and process to a smooth paste, holding the temperature at from 55° to 65° C. The resulting paste should remain plastic on cooling. When filtered from a dilute (approximately 1%) aqueous suspension, not over 2% of residue, after drying, should be retained on a 150 mesh sieve.

As pointed out above, the presence of the high boiling water immiscible organic liquid not only serves to thicken and stabilize the paste, but it also retards the loss of water from the paste upon exposure to the atmosphere. The N:N'-diphenyl-ethylene-diamine, micronized and stabilized by the process as described above, gives a paste which, by simply mixing with water, produces a milk-like suspension of the effective anti-fume agent, which paste can be placed in storage or added directly to the dye bath. The anti-fume agent is readily absorbed by the acetate silk fibers in the aqueous fiber-treating solution.

I claim:
1. A stable, aqueous emulsion paste of an anti-fume agent of the formula:

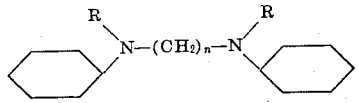

wherein $n$ is an integer of from 2 to 6 inclusive, R is a substituent of the group consisting of a hydrogen atom, a methyl radical, an ethyl radical, and a hydroxy-ethyl radical, containing from 30% to 50% of the anti-fume agent, from 1% to 5% of methyl cellulose having a viscosity of from 15 to 500 centipoises, and from 2% to 15% of an organic liquid which may be used as a plasticizer in preparation of resin products, and wherein the anti-fume agent particles are of such a size that not more than 10% will be retained in a 150 mesh sieve when a sample of the paste is filtered from a dilute aqueous suspension.

2. A non-settling water-dispersible aqueous paste of an anti-fume agent of the formula:

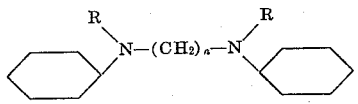

wherein $n$ is an integer of from 2 to 6 inclusive, R is a substituent of the group consisting of a hydrogen atom, a methyl radical, an ethyl radical, and a hydroxy-ethyl radical, which contains from 30% to 50% of the anti-fume agent, from 1% to 5% of methyl cellulose having a viscosity of from 15 to 500 centipoises, from 2% to 15% of an organic liquid which may be used as a plasticizer in preparation of resin products, from 0.5% to 3% of an anionic dispersing agent, and wherein the anti-fume agent particles are of such a size that not more than 10% will be retained in a 150 mesh sieve when a sample of the paste is filtered from a dilute aqueous suspension.

3. A non-settling water-dispersible aqueous paste of N:N'-diphenyl-ethylene-diamine, which paste contains from 30% to 50% of the diamine, from 1% to 5% of methyl cellulose having a viscosity of from 15 to 500 centipoises, from 2% to 15% of an organic liquid which may be used as a plasticizer in preparation of resin products, from 0.5% to 3% of an anionic dispersing agent, and wherein the diamine particles are of such a size that not more than 10% will be retained in a 150 mesh sieve when a sample of the paste is filtered from a dilute aqueous suspension.

4. A non-settling water-dispersible aqueous paste of N:N'-diphenyl-ethylene-diamine, which paste contains from 30% to 50% of the diamine, from 1% to 5% of methyl cellulose having a viscosity of from 15 to 500 centipoises, from 2% to 15% of dimethyl phthalate, from 0.5% to 3% of an anionic dispersing agent, and wherein the diamine particles are of such a size that not more than 10% will be retained in a 150 mesh sieve when a sample of the paste is filtered from a dilute aqueous suspension.

5. A non-settling water-dispersible aqueous paste of N:N'-diphenyl-ethylene diamine, which paste contains from 30% to 50% of the diamine, from 1% to 5% of methyl cellulose having a viscosity of from 15 to 500 centipoises, from 2% to 15% of tributoxy ethyl phosphate, from 0.5% to 3% of an anionic dispersing agent, and wherein the diamine particles are of such a size that not more than 10% will be retained in a 150 mesh sieve when a sample of the paste is filtered from a dilute aqueous suspension.

6. A non-settling water-dispersible aqueous paste of N:N'-diphenyl-ethylene-diamine, which paste contains from 30% to 50% of the diamine, from 1% to 5% of methyl cellulose having a viscosity of from 15 to 500 centipoises, from 2% to 15% of di-isobutyl adipate, from 0.5% to 3% of an anionic dispersing agent, and wherein the diamine particles are of such a size that not more than 10% will be retained in a 150 mesh sieve when a sample of the paste is filtered from a dilute aqueous suspension.

FRANCIS HERVEY SMITH.

REFERENCES CITED

The following references are of record in the file of this patent:

UNITED STATES PATENTS

| Number | Name | Date |
|---|---|---|
| 1,719,944 | Risse | July 9, 1929 |
| 2,006,720 | Rogers | July 2, 1935 |
| 2,518,393 | Smith | Aug. 8, 1950 |